(12) United States Patent
Hüger et al.

(10) Patent No.: US 10,228,700 B2
(45) Date of Patent: Mar. 12, 2019

(54) METHOD FOR SUPPORTING A VEHICLE DOCKING OPERATION AND A SUPPORT SYSTEM

(71) Applicant: VOLKSWAGEN AG, Wolfsburg (DE)

(72) Inventors: Philipp Hüger, Rühen (DE); Stefan Brosig, Hankensbüttel (DE); Ramona Schwemin, Salzgitter (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 15/669,699

(22) Filed: Aug. 4, 2017

(65) Prior Publication Data

US 2018/0039278 A1    Feb. 8, 2018

(30) Foreign Application Priority Data

Aug. 5, 2016  (DE) .......................... 10 2016 214 597

(51) Int. Cl.
| | |
|---|---|
| *G05D 1/02* | (2006.01) |
| *B60D 1/62* | (2006.01) |
| *B60W 10/18* | (2012.01) |
| *G06T 7/70* | (2017.01) |
| *B60D 1/36* | (2006.01) |
| *B60W 10/20* | (2006.01) |

(Continued)

(52) U.S. Cl.
CPC ............. *G05D 1/0253* (2013.01); *B60D 1/36* (2013.01); *B60D 1/62* (2013.01); *B60W 10/18* (2013.01); *B60W 10/20* (2013.01); *B60W 50/14* (2013.01); *G05D 1/0219* (2013.01); *G05D 1/0223* (2013.01); *G06T 7/70* (2017.01); *B60D 1/06* (2013.01); *B60W 2050/146* (2013.01); *B60W 2420/42* (2013.01); *B60W 2710/18* (2013.01); *B60W 2710/20* (2013.01); *B60W 2720/10* (2013.01); *G06T 2207/10016* (2013.01); *G06T 2207/30241* (2013.01); *G06T 2207/30252* (2013.01)

(58) Field of Classification Search
USPC ......................................................... 701/25
See application file for complete search history.

(56) References Cited

U.S. PATENT DOCUMENTS

| | | | |
|---|---|---|---|
| 2005/0000738 A1* | 1/2005 | Gehring | ................ B62D 13/06 180/14.1 |
| 2013/0226390 A1 | 8/2013 | Luo et al. | |

(Continued)

FOREIGN PATENT DOCUMENTS

| | | |
|---|---|---|
| DE | 10302545 A1 | 7/2004 |
| DE | 102012001380 A1 | 8/2012 |

OTHER PUBLICATIONS

Search Report for German Patent Application No. 10 2016 214 597.5; dated May 17, 2017.

*Primary Examiner* — Tyler D Paige
(74) *Attorney, Agent, or Firm* — Barnes & Thornburg LLP

(57) ABSTRACT

A method for assisting a process of coupling a vehicle to a towed object, in particular, a trailer, including detecting an object position of a coupling element of the towed object which is suitable for coupling to a mating coupling element of the vehicle, determining a travel path of the vehicle for reaching a target position, wherein the vehicle is positioned in the target position so the coupling element and the mating coupling element are couplable. Also disclosed is an assistance system for assisting a process of coupling a vehicle.

14 Claims, 3 Drawing Sheets

(51) Int. Cl.
*B60W 50/14* (2012.01)
*B60D 1/06* (2006.01)

(56) References Cited

U.S. PATENT DOCUMENTS

| | | | |
|---|---|---|---|
| 2014/0303849 A1* | 10/2014 | Hafner | B62D 13/06 |
| | | | 701/42 |
| 2015/0115571 A1* | 4/2015 | Zhang | B60D 1/06 |
| | | | 280/477 |
| 2016/0023601 A1 | 1/2016 | Windeler | |
| 2016/0101810 A1* | 4/2016 | Xu | B62D 15/0285 |
| | | | 701/41 |
| 2016/0159347 A1* | 6/2016 | Lavoie | B60W 10/18 |
| | | | 701/41 |
| 2016/0159348 A1* | 6/2016 | Lavoie | B62D 13/06 |
| | | | 701/41 |
| 2016/0185169 A1* | 6/2016 | Strand | B60D 1/246 |
| | | | 280/479.1 |
| 2016/0187888 A1* | 6/2016 | Turner | B60D 1/44 |
| | | | 701/49 |
| 2016/0304122 A1* | 10/2016 | Herzog | B60D 1/36 |
| 2016/0378118 A1* | 12/2016 | Zeng | G05D 1/0246 |
| | | | 701/28 |
| 2017/0101130 A1* | 4/2017 | Lavoie | B62D 1/02 |
| 2017/0123431 A1* | 5/2017 | Ghneim | B60W 10/04 |

* cited by examiner

METHOD FOR SUPPORTING A VEHICLE DOCKING OPERATION AND A SUPPORT SYSTEM

PRIORITY CLAIM

This patent application claims priority to German Patent Application No. 10 2016 214 597.5, filed 5 Aug. 2016, the disclosure of which is incorporated herein by reference in its entirety.

SUMMARY

Illustrative embodiments relate to a method for assisting a process of coupling a vehicle to a towed object and to an assistance system for assisting a process of coupling a vehicle.

BRIEF DESCRIPTION OF THE DRAWINGS

Further measures are evident from the following description concerning some exemplary embodiments, which are illustrated schematically in the figures. All features which emerge from the claims, the description or the drawings, including structural details, spatial arrangement and methods, can be essential both by themselves and in a wide variety of combinations. It should be taken into consideration here that the figures are only descriptive in nature and are not intended to restrict in any form. In the figures:

DETAILED DESCRIPTION

Figure 1A:
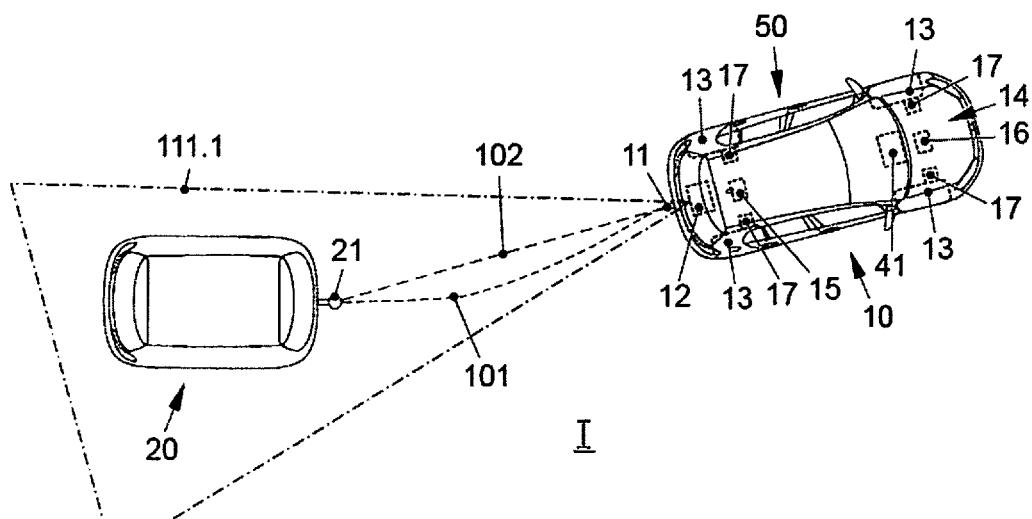
FIGS. 1a-1c show a vehicle with the disclosed assistance system in a first exemplary embodiment.

To couple a towed object, such as a trailer, for example, to a vehicle, it is known to bring the vehicle with a trailer coupling of the vehicle in proximity to a coupling element of the towed object and thereupon to raise the coupling of the trailer, usually by a crank mechanism. The trailer can then be moved by one or more persons, for example, such that the coupling of the trailer is positioned above the trailer coupling of the vehicle, such that when the coupling height of the trailer is readjusted, the trailer is coupled to the trailer coupling of the vehicle. However, this requires a high degree of manual activity, wherein heavy towed objects, such as, for example, an already loaded trailer or a device for an agricultural machine, such as a plow, for example, cannot be moved at all or can be moved only with great effort. In this regard, for a loaded trailer, for example, a number of persons may be required to carry out the coupling process. A single person has to get into and out of the vehicle repeatedly to carry out the coupling process.

DE 103 02 545 A1 discloses an assistance system for docking processes of motor vehicles, to detect position data of a trailer coupling to assist the driver during the docking process. To obtain the position data, however, a complex sensor system is used, such as, for example, a stereocamera or a camera which, together with further sensors for detecting the trailer coupling, yields data from which jointly the required items of information are obtained. However, such cameras and sensors require a comparatively large structural space and cause high costs. The combination and processing of the different signals from different systems may also be complex, for example, if it becomes necessary to coordinate the sensor data with the image details.

The disclosed embodiments at least partly to eliminate the above drawbacks known from the prior art. Disclosed embodiments provide an assistance for a process of coupling a vehicle to a towed object in a simple and cost-effective manner, wherein the assistance may be intended to be at least partly automated in conjunction with a high reliability.

The above object is achieved by the disclosed embodiments. Features and details that have been described in association with the disclosed method are also applicable, of course, in association with the disclosed assistance system, and respectively vice versa, such that regarding the disclosure concerning the individual embodiment reference always is or can be made reciprocally.

The disclosed method for assisting a process of coupling a vehicle to a towed object comprises:

detecting an object position of a coupling element of the towed object, which is suitable for coupling to a mating coupling element of the vehicle, determining a travel path of the vehicle for reaching a target position, wherein the vehicle is positioned in the target position in such a way that the coupling element and the mating coupling element are couplable.

The towed object can be a trailer. Furthermore, at least detecting the object position of the coupling element comprises a procedure in which, by a camera, a first image of the coupling element is generated and, after a time operation, at least one second image of the coupling element is generated and at least one item of spatial information of the coupling element is determined by a relation between the first image and the second image.

Here, detecting the object position and determining the travel path can constitute a single operation in each case, wherein an interlacing and/or parallel implementation are also conceivable. The vehicle may be a motor vehicle, in particular an automobile or a truck. The towed object can furthermore be a trailer. Alternatively, however, the towed object can also be a device for agriculture, such as a plow, for example. The coupling element may be understood to be a coupling which may configured in a cup-like manner to be connectable to the mating coupling element, which may be, at least in sections, configured in a ball-like manner and is fixed to the vehicle. In this regard, coupling can be understood to mean that the coupling element is connected to the mating coupling element in a positively locking and/or force-locking manner, such that the towed object can be towed by the vehicle. The object position within the meaning of the present disclosure can be the real position of the object, i.e., of the coupling element, relative to a reference object, such as, for example, the mating coupling element, the camera or a background. During the time operation, a relative position of the camera with respect to the coupling element can change, such that the first and second images differ at least partly, in particular in the recording angle. During the time operation, the camera and/or the vehicle can move. In this regard, the vehicle can already travel along part of the travel path or the camera can be moved independently of the vehicle to produce two images from two different perspectives. An image within the meaning of the present disclosure can be, for example, a snapshot or a sequence of a video recording, wherein the image at least partly or completely comprises data of the real recording of the camera. Consequently, the time operation can be a discrete time operation, such that images are generated at regular intervals, or a dynamic time operation, wherein, for example, the generation of the second image is dependent on a change in position of the camera and/or of the vehicle. The spatial information can furthermore comprise or be a three-dimensional coordinate of the coupling element. This can relate to a further object which is likewise detected by the camera in the images. However, a coordinate which relates to a virtual coordinate system of the vehicle and/or of the camera can also be involved. Furthermore, the spatial information can comprise further data, such as, for example, further coordinates or further objects in a detection region. The relation of the two images can furthermore comprise a mathematical relationship between the first and second images, wherein, for example, an image coordinate of the coupling element in the first image is compared with an image coordinate of the coupling element in the second image. In this case, moreover, further parameters such as, e.g., the height of the camera on the vehicle and/or the loading situation of the vehicle can influence the relation. Consequently, the spatial information can, for example, influence the determination of the travel path and thus increase the accuracy of the travel path or can be made available as information to the user for indirect or direct assistance.

Consequently, the disclosed method can be implemented with an arbitrary camera, optionally a reversing camera. The method can further be retrofittable, for example, given an existing camera and an existing controller, wherein only little structural space is necessary as a result of the required components. Since the first image and the second image are furthermore recorded by the same camera, accumulation of measurement uncertainties can furthermore be kept small, such that the method offers a high reliability in conjunction with a high possible degree of automation.

In a disclosed method it can be provided that the camera is a monocular camera. A monocular camera may be understood to be a camera which has, for example, only one lens or at least only one lens unit. By virtue of the disclosed method, it is not necessary to provide a second lens unit which records the coupling element simultaneously with a first lens unit from two different perspectives. Consequently, only a small structural space requirement arises for the monocular camera, which can furthermore also be cost-effective. Furthermore, the retrofittability of the method is also fostered by the monocular camera, since the requirements made of an already existing system are minor.

In the context of the disclosed embodiments, at least the first image and/or the second image can be displayed to a user and an image position of the coupling element at least in the first and/or second image can be markable by the user. To that end, after the generation of the first and/or second image the user can be invited to mark the image position, wherein the invitation can be repeatable respectively after the second image and, if appropriate, further images. In this case, the image position can comprise the two-dimensional coordinates of the coupling element in one of the images. In this regard, the image position can differ from the object position in that the image position lacks spatial information in comparison with the object position. The fact that the user can thus assist the method by the user's input results in a reliable detection and thus an increased accuracy. The interactive participation of the user can also create an increased acceptance of the method by the user. By virtue of the fact that the user can furthermore intervene in the method, it is additionally possible to further increase the safety of the method if an incorrect identification occurs. If there are a plurality of potential coupling elements in an image, the user can additionally provide for the actuation of the correct coupling element by the marking.

In a disclosed method, the spatial information can comprise a height of the coupling element wherein a user of the vehicle obtains a feedback message if the height of the coupling element deviates from a reference height range. The reference height range can span a tolerance range in which the height of the coupling element is considered to be non-critical, or be a single height corresponding, for example, to the height of the mating coupling element on the vehicle. As a result, a risk of collision between the vehicle and the towed object is reducible in an automated manner. By virtue of the feedback message, the user can furthermore be accompanied during intervention in the process, such that the user's decision as to whether or not to intervene is automatically assisted.

In a disclosed method, the spatial information can primarily also comprise a distance from the vehicle to the coupling element wherein the distance is used for determining the travel path of the vehicle. Accordingly, for the distance it is possible to provide a variable in a mathematical function for determining the travel path. In this case, the distance can be understood to be, for example, the air line between the coupling element and the mating coupling element or the projection of the air line onto a background. An accurate determination of the travel path is made possible as a result. Furthermore, by way of example, a braking process can be regulated in an operation-like manner, thus resulting in gentle braking when the vehicle approaches the towed object. As a result, it is possible to achieve an improvement in convenience for the driver of the vehicle.

In the context of the present disclosure, it can furthermore be provided that a determination of at least one own position of the vehicle is carried out using the relation between the first and second images and/or using a measured wheel pulse from at least one wheel of the vehicle. In this case, the own position can be understood to be a coordinate in relation to a point in the surroundings and/or a plane of the background. Consequently, the own position can influence, in particular mathematically, the determination of the travel path and/or the detection of the object position of the coupling element. A wheel pulse can be understood to be, for example, a signal which is initiated after a specific angular revolution of a wheel and/or a signal which provides information about the speed of revolution of the wheel. The accuracy of the determination of the travel path and/or of the detection of the coupling element is improved as a result.

It is furthermore conceivable that, in a disclosed method, detecting the coupling element and/or determining the travel path are/is carried out iteratively wherein the target position and the object position are coordinated with one another. Being carried out iteratively can be understood to mean a stepwise, or dynamic, adaptation, such that the accuracy of the detection of the coupling element and/or the determination of the travel path is improved with each further iteration operation. Consequently, it is possible to introduce every point in time during the traveling along the travel path, such that the parameters involved can be adapted to varying ambient conditions and/or more accurate knowledge by the camera and/or the vehicle position.

In a disclosed method it can be provided that the travel path is covered by the vehicle semi-automatically or automatically. In this case, covering the travel path semi-automatically can be understood to mean that, for example, steering and/or braking are/is actuated by a control unit, and covering the travel path automatically can be understood to mean that, for example, steering, acceleration and braking are undertaken by the control unit. The further automation results in increased convenience for the user and safety vis-à-vis human errors when carrying out the coupling process.

In accordance with a further disclosed embodiment, an assistance system for assisting a process of coupling a vehicle is provided. In this case, the assistance system comprises a control unit, a camera and a display. Furthermore, the control unit is designed for detecting a coupling element of the towed object, which is suitable for coupling to the mating coupling element of the vehicle, wherein, by the camera, a first image of the coupling element is generated and, after a time operation, at least one second image of the coupling element is generated and at least one item of spatial information of the coupling element is determined by a relation between the first image and the second image, and determining a travel path of the vehicle for reaching a target position, wherein the vehicle is positioned in the target position in such a way that the coupling element and the mating coupling element are couplable, wherein the images of the camera are reproducible by the display. In this case, the control unit can comprise various control devices or controllers.

The display can be, for example, a screen that is LED- or OLED-based, such that the convenience thereof is increased by the display. In this case, detecting the coupling element and/or the spatial information can furthermore influence the determination of the travel path. Furthermore, a disclosed assistance system thus entails the same benefits as have been described comprehensively with respect to the disclosed method.

In the context of the disclosed embodiments, therefore, in a disclosed assistance system it can furthermore be provided that the control unit comprises a camera controller for detecting the coupling element and/or a main controller for determining the travel path wherein the camera controller and the main controller are connected for communication. In this case, furthermore, the camera controller may be connected for communication with the camera to obtain or evaluate the images from the camera. The main controller may perform calculations for the travel path. Thus, the camera controller may be arranged at the rear of the vehicle, in particular in proximity to the camera, such that the data connection can simultaneously be configured for a high volume of data and can be cost-effective as a result of a short connection path. Furthermore, the data connection between the camera controller and the main controller can be configured in a simple manner, such that, for example, a BUS system is usable, since here merely the exchange of a result from the relation of the images may be necessary.

In the disclosed assistance system the camera controller can be configured to determine a height of the coupling element from at least the first and second images. This can, for example, be implementable by a computer program and/or use the structure-from-motion approach to determine the height of the coupling element. As a result, the risk of collision between the coupling element and the mating coupling element is reduced and the user is assisted in his/her decision when intervening in the process.

In the disclosed assistance system it can furthermore be provided that the main controller is connected for communication with at least one wheel sensor, such that the main controller carries out a determination of an own position of the vehicle using a wheel pulse from at least one wheel of the vehicle, the wheel pulse being measured by the wheel sensor. The communication connection between main controller and wheel sensor can be ensured, for example, by a wired or wireless connection. The wheel sensor can furthermore be configured for recording a wheel pulse, such that, for example, markings on the inner side of the wheel, are detectable by the wheel sensor. Furthermore, the relation between the first and second images can influence the determination of the own position. This results in an increased accuracy of the method and/or the assistance of an iterative procedure to dynamically increase the accuracy further.

In the disclosed assistance system the display can be configured, when reproducing at least one of the images, to detect a marking of an image position of the coupling element by a user. As a result, the accuracy of the detection of the coupling element can be increased further. The display may comprise a touchscreen, such that a user can mark the object position directly in the reproduction of the image. Accordingly, the accuracy when detecting the object position of the coupling element can be increased further and/or a selection of a coupling element when there are a plurality of towed objects lined up alongside one another can be made possible.

The display can furthermore be part of a mobile terminal. In this case, the mobile terminal can be, for example, a smartphone or a tablet. This makes it possible for the user to remain outside the vehicle during the coupling process. Consequently, convenience for the user of the assistance system can be increased further if the user has to operate the coupling element manually anyway when the vehicle is situated in the target position, for example, to latch the coupling element with the mating coupling element. Thus, getting in and out of the vehicle may not be necessary.

Furthermore, the control unit can be configured for carrying out a disclosed method so that further benefits from among those mentioned arise.

In the following figures, identical reference signs are used for the same technical features even of different exemplary embodiments.

Figure 1B:
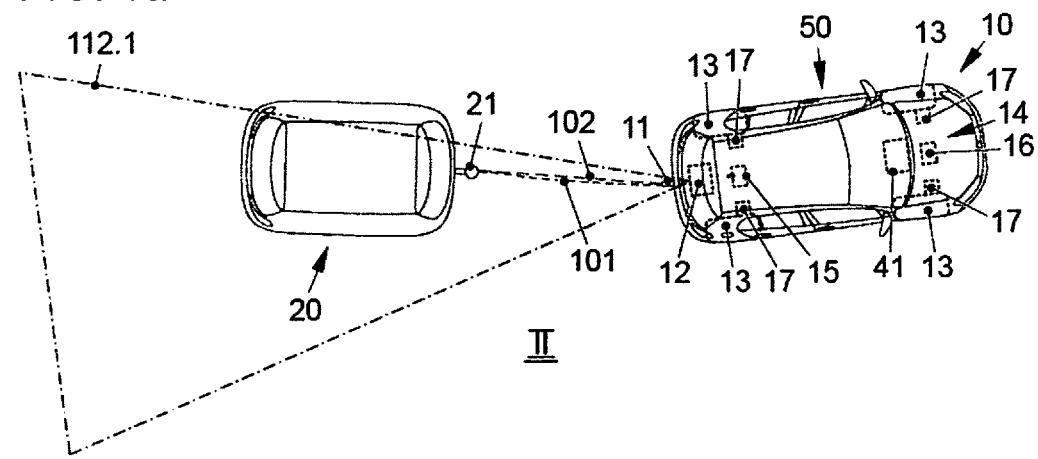

FIG. 1a shows a vehicle 10 with an assistance system 50 for assisting a process of coupling the vehicle 10 to a towed object 20 in a first own position I. In this case, the vehicle 10 comprises a camera 12 that can detect a coupling element 21 of the towed object 20. In the exemplary embodiment illustrated, the towed object 20 is a trailer, other towed objects alternatively being conceivable here. In the first own position I of the vehicle 10, the camera 12 thus detects a first image 111 of the coupling element 21 in a first detection region 111.1. In this case, the camera 12 views the coupling element 21 from a first angle. From the image data of the first image 111, a control unit 14 comprising a camera controller 15, which is connected for communication with the camera 12, and/or a main controller 16, which is connected for communication with the camera controller 15 and/or the camera 12, can determine a travel path 101 by which the vehicle 10 reaches a target position III for coupling the coupling element 21 to a mating coupling element 12 of the vehicle 10. If the vehicle 10 then begins to travel along the travel path 101, it reaches a second own position II, as illustrated in FIG. 1b. In the second own position II, the camera 12 views the towed object 20 or the coupling element 21 at a second angle. In this case, a second image 112 of the coupling element 21 is detected, a second detection region 112.1 being imaged in the process. The first and second images 111, 112 can be displayed on a display 41, wherein the display 41 may be arranged in a center console of the vehicle 10. From the first image 111 and the second image 112, the camera controller 15 may determine a relation between the two images 111, 112, such that at least one item of spatial information 102, 103 of the coupling element 21 is determined by the relation. The spatial information 102, 103 can be calculated, for example, by the use of a structure-from-motion approach, this calculation may be performed by the camera controller 15. Consequently, the camera 12 may be a monocular camera or a mono camera, since the images 111, 112 are detectable at different points in time. In this case, the spatial information 102, 103 may comprise a height of the coupling element 21. A feedback message is furthermore given to a user 30 of the vehicle 10 if the height 103 of the coupling element 21 deviates from a reference height range. In this regard, the user 30 can obtain, for example, a feedback message if the height 103 of the coupling element 21 in relation to a background 104 is less than a height of a mating coupling element 11 of the vehicle 10 in relation to a background 104. In this case, there would possibly be a risk of collision between the coupling element 21 and the mating coupling element 11, such that the method, e.g., can stop or can make it possible for the user 30 to intervene. Furthermore, provision can be made for the spatial information 102, 103 to comprise a distance 102 from the vehicle 10 to the coupling element 21. The distance 103 can furthermore be used by the main controller 16 for determining the travel path 101. Determining the travel path 101 can thus be carried out iteratively, such that in the second own position II of the vehicle 10 as well a determination of the travel path 101 can be performed once again such that the accuracy is improved further since further data are available in the second own position II. Detecting the object position 100 of the coupling element 21 can thus also be carried out iteratively, such that in further own positions in the course of further traveling along the travel path 101 by the vehicle 10 the accuracy of the detection of the object position 100 also increases. Furthermore, the assistance system 50 comprises wheel sensors 17 that can record a wheel pulse, such that the rotation angle covered by at least one wheel 13 of the vehicle 10 is determinable. In this regard, the wheel sensors 17 can record, for example, the rotation of the wheel 13 by a wheel pulse being measured, for example, after a rotation of the wheel 13 by 2°. That means that in the context of the wheel pulse a respective signal is generated which may be recorded in the main controller 16 of the vehicle 10, which is connected for communication with the wheel sensors 17. Consequently, the vehicle 10 can, for example, determine an already covered part of the travel path 101 and use it in the iterative determination of the travel path 101 to the target position III. The main controller 16 can thereby furthermore determine the own position I, II of the vehicle 10 itself. In this case, the own position I, II can be related, for example, to the towed object 20 and/or a background 104 of the vehicle 10 or a further coordinate or coordinate of the surroundings.

Figure 1C:
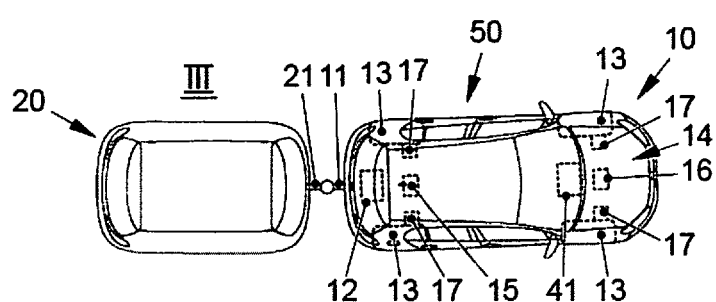

The second own position II can be followed by as many own positions as desired until the coupling process is ended, such that detecting the object position 100 and determining the travel path 101 can comprise further iteration operations. Finally, gentle braking of the vehicle 10 can be effected until the vehicle 10 has reached a target position III, as illustrated in FIG. 1c. In this case, the coupling element 21 and the mating coupling element 11 are couplable in the target position III, wherein here, for example, the coupling element 21 and the mating coupling element 11 are configured in such a way that the coupling element 21 fits over the mating coupling element 11 in a cup-like manner, which mating coupling element may be configured in a ball-like manner. In this case, covering the travel path 101 from the first own position 101 via at least the second own position II to the target position III may be carried out semi-automatically or automatically, wherein operation of the vehicle 10 by the user is necessary at least in part when covering the travel path 101 semi-automatically.

Figure 2A:
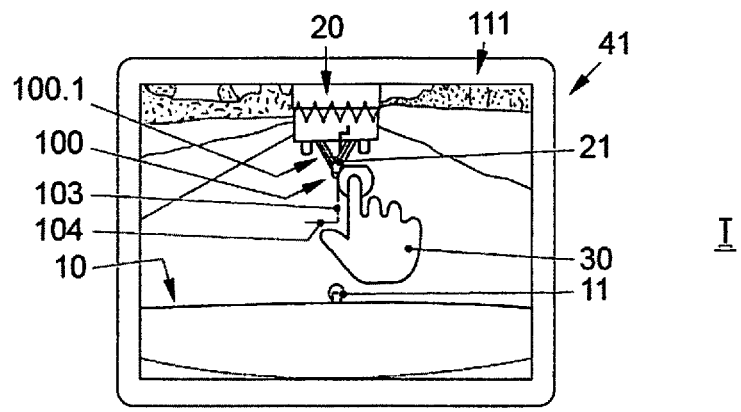
FIGS. 2a-2c show images during the disclosed method in a further exemplary embodiment.
Figure 2B:
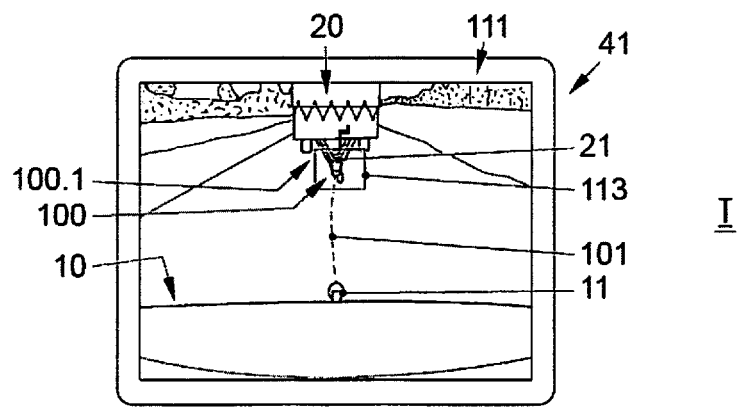
Figure 2C:
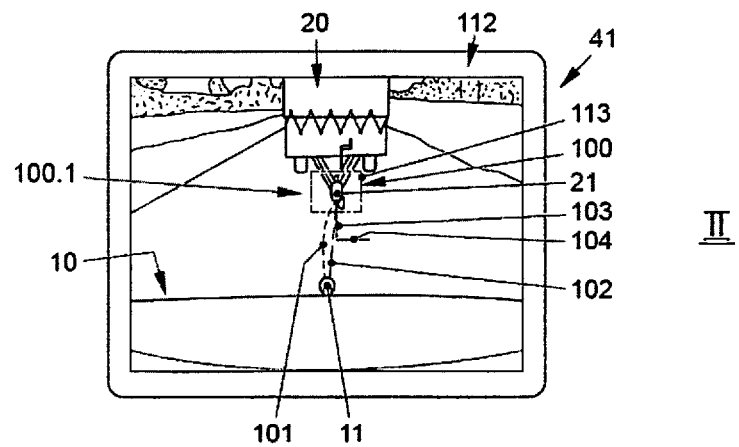

FIGS. 2a to 2c show the sequence of a method for assisting a process of coupling a vehicle 10 to a towed object 20 based on different images 111, 112. In this regard, FIG. 2a shows a first image 111 of a coupling element 21 of the towed object 20 wherein the towed object 20 is a trailer. However, further towed objects are also conceivable here. In this case, the vehicle 10 is situated in a first own position I. The first image 111 may be displayed to a user 30 on a display 41. The display 41 may be configured as a touchscreen, such that the user 30 can mark the coupling element 21 or an image position 100.1 of the coupling element 21 in the image 111. The coupling element 21 in the first image 111 can thereupon be marked, for example, as shown in FIG. 2b, such that the user 30 can verify his/her input.

This is followed thereupon by determining a travel path 101 of the vehicle 10 for reaching a target position III, in which the coupling element 21 and a mating coupling element 11 of the vehicle 10 are couplable. After covering part of the travel path 101, the vehicle 10, as illustrated in FIG. 2c, is furthermore situated in a second own position II, in which a second image 112 of the coupling element 21 is generated by a camera 12 of the vehicle 10 or of an assistance system 50. Consequently, as a result of a relation between the first image 111 and the second image 112 and a camera controller 15 of an assistance system 50, a relation can be generated, such that at least one item of spatial information 102, 103 of the coupling element 21 is determined. The spatial information 102, 103 can comprise, e.g., a height 103 of the coupling element 21 with respect to the background 104 and/or a distance 102 from the coupling element 21 to a mating coupling element 11 of the vehicle 10. As a result, it is possible to detect an object position 100 with a high accuracy. Furthermore, the spatial information 102, 103 can be used to improve the accuracy of the travel path 101. In the second image 112, too, which likewise may displayed on the display 41, a marking 113 can be effected to display to the user 30 the object position 100 or image position 100.1 of the coupling element 21 in the second image 112 as identified on the part of the system. Furthermore, in the second image 112, too, the user 30 can be invited to mark the coupling element 21 in the second image 112, such that the detected object position 100 is verified and/or corrected and the accuracy can thus be increased further. The vehicle 10 can be a vehicle with an assistance system in accordance with the first exemplary embodiment.

Figure 3:
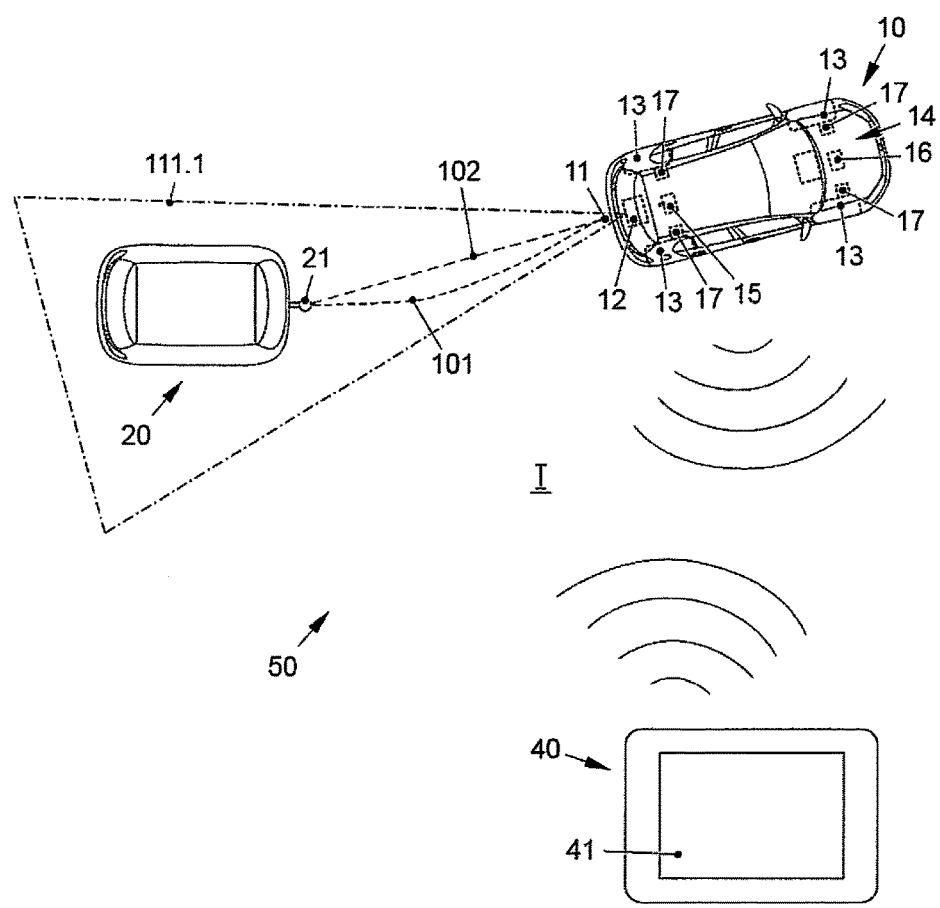
FIG. 3 shows the disclosed assistance system in a further exemplary embodiment.

FIG. 3 shows an assistance system 50 in a further exemplary embodiment. In this case, a vehicle 10 situated in a first own position I is furthermore equipped with a camera 12 to detect a coupling element 21 in a detection region 111.1, to which the vehicle 10 is couplable by a mating coupling element 11. In this case, a control unit 14 comprising a camera controller 15 and/or a main controller 16 of the vehicle 10 can be connected for communication, optionally connected for wireless communication, with a mobile terminal 40. In this case, the mobile terminal 40 can furthermore comprise a display 41 for displaying a first and a second image 111, 112 of the coupling element 21 during the coupling process 10. Consequently, the user 30 can remain outside the vehicle 10, such that the coupling process proves to be convenient. A wireless connection can be configured as WiFi or a Bluetooth connection, wherein a wired communication connection can comprise, for example, a USB connection. An image position 100.1 of the coupling element 21 may be markable by the user 30 in the first image 111 and in the second image 112 via the display 41 of the mobile terminal 40, such that the data of the marking can be forwarded to the main controller 16 and/or the camera controller 15 and can influence a detection of the object position 100 and/or a determination of a travel path 101 of the vehicle 10. The further sequence of the method for coupling the vehicle 10 to the towed object 20 can take place as illustrated in FIGS. 2a to 2c such that the vehicle 10, via a second own position II, is able to reach a target position III, as illustrated in FIGS. 1b and 1c such that the assistance system 50 and/or the vehicle 10 can analogously have all the features of the first exemplary embodiment.

The present disclosure describes above explanations of the embodiment exclusively in the context of examples. It goes without saying that individual features of the embodiments, insofar as technically expedient, can be freely combined with one another, without departing from the scope of the present disclosure.

LIST OF REFERENCE SIGNS

10 Vehicle
11 Mating coupling element
12 Camera
13 Wheel
14 Control unit
15 Camera controller
16 Main controller
17 Wheel sensor
20 Towed object
21 Coupling element
30 User
40 Mobile terminal
41 Display
50 Assistance system
100 Object position
100.1 Image position
101 Travel path
102 Distance
103 Height of the coupling element
104 Background
111 First image
111.1 First detection region
112 Second image
112.1 Second detection region
113 Marking
I First own position
II Second own position
III Target position

The invention claimed is:

1. A method for assisting a process of coupling a vehicle to a towed object, the method comprising:
detecting an object position of a coupling element of the towed object, which is suitable for coupling to a mating coupling element of the vehicle;
determining a travel path of the vehicle for reaching a target position, wherein the vehicle is positioned in the target position so the coupling element and the mating coupling element are couplable; and
detecting a height of the coupling element; and
transmitting a feedback message to a user of the vehicle in response to a determination that the height of the coupling element deviates from a reference height range,
wherein at least detecting the object position of the coupling element comprises a procedure in which, by using a camera, a first image of the coupling element is generated and, after a time operation, at least one second image of the coupling element is generated and at least one item spatial information of the coupling element is determined by a relation between the first image and the second image.

2. The method of claim 1, wherein the camera is a monocular camera.

3. The method of claim 1, wherein at least one of the first image and the second image is displayed to the user and an image position of the coupling element of a corresponding image is markable by the user.

4. The method of claim 1, wherein the spatial information comprises a distance from the vehicle to the coupling element, wherein the distance is used for determining the travel path of the vehicle.

5. The method of claim 1, wherein a determination of at least one own position of the vehicle is carried out using the relation between the first and second images or using a measured wheel pulse from at least one wheel of the vehicle.

6. The method of claim 1, wherein detecting the coupling element and/or determining the travel path are/is carried out iteratively, wherein the target position and the object position are coordinated with one another.

7. The method of claim 1, wherein the travel path is covered by the vehicle semi-automatically or automatically.

8. An assistance system for assisting a process of coupling a vehicle, the assistance system comprising a control unit, a camera and a display, wherein the control unit:
detects a coupling element of the towed object, which is suitable for coupling to a mating coupling element of the vehicle, wherein, by the camera, a first image of the coupling element is generated and, after a time operation, at least one second image of the coupling element is generated and at least one item of spatial information of the coupling element is determined by a relation between the first image and the second image,
determines a travel path of the vehicle for reaching a target position, wherein the vehicle is positioned in the target position so the coupling element and the mating coupling element are couplable, and
transmits a feedback message to a user of the vehicle in response to a determination that a height of the coupling element deviates from a reference height range,
wherein the images of the camera are reproducible by the display.

9. The assistance system of claim 8, wherein the control unit comprises a camera controller for detecting the coupling element and/or a main controller for determining the travel path, wherein the camera controller and the main controller are connected for communication.

10. The assistance system of claim 8, wherein the camera controller determines the height of the coupling element from at least the first and second images.

11. The assistance system of claim 8, wherein the main controller is connected for communication with at least one wheel sensor so the main controller carries out a determination of an own position of the vehicle using a wheel pulse from at least one wheel of the vehicle, the wheel pulse being measured by the wheel sensor.

12. The assistance system of claim 8, wherein the display, when reproducing at least one of the images, detects a marking of an image position of the coupling element by the user.

13. The assistance system of claim 8, wherein the display is part of a mobile terminal.

14. The assistance system of claim 8, wherein the control unit carries out a method for assisting a process of coupling a vehicle to a towed object, the method comprising:
- detecting the object position of the coupling element of the towed object, which is suitable for coupling to the mating coupling element of the vehicle; and
- determining the travel path of the vehicle for reaching the target position, wherein the vehicle is positioned in the target position so the coupling element and the mating coupling element are couplable,
- wherein at least detecting the object position of the coupling element comprises a procedure in which, by using the camera, the first image of the coupling element is generated and, after a time operation, the at least one second image of the coupling element is generated and at least one item spatial information of the coupling element is determined by relation between the first image and the second image.

\* \* \* \* \*